United States Patent [19]

Jaekle, Jr. et al.

[11] Patent Number: 4,715,399

[45] Date of Patent: Dec. 29, 1987

[54] LIQUID-PROPELLANT MANAGEMENT SYSTEM FOR ROCKETS AND SPACE VEHICLES

[76] Inventors: Don E. Jaekle, Jr., 1042 Candlewood Ave., Sunnyvale; R. K. Grove, 484 Panchita Way, Los Altos, both of Calif.

[21] Appl. No.: 665,657

[22] Filed: Oct. 29, 1984

[51] Int. Cl.$^4$ .................................................. B64G 1/00
[52] U.S. Cl. .................................... 137/209; 137/574; 137/576; 137/590
[58] Field of Search ............... 137/154, 209, 206, 590, 137/574, 576, 171, 183

[56] References Cited

U.S. PATENT DOCUMENTS

| | | | |
|---|---|---|---|
| 4,168,718 | 9/1979 | Frosch | 137/574 X |
| 4,399,831 | 8/1983 | Robert | 137/154 |
| 4,489,745 | 12/1984 | Netter | 137/593 X |

*Primary Examiner*—Alan Cohan

[57] ABSTRACT

A system for providing substantially gas-free liquid propellant to the engine(s) of a rocket or space vehicle comprises a storage tank (10) having a first opening (15) that communicates with a "fill, drain and feed" line (17) and a second opening (18) that communicates with a "pressurant and vent" line (20). A hollow trap (13) having a porous inlet window (22) and an exit port (21), which is aligned with the first opening (15), is positioned within the tank (10). A liner (14) having a plurality of porous windows (24) is positioned inside the trap (13), and is secured to the trap (13) circumjacent the inlet window (22) and circumjacent the exit port (21), but is elsewhere spaced apart from the interior wall of the trap (13). The inlet window (22) of the trap (13) and the porous windows (24) of the liner (14) have pores dimensioned to permit passage of liquid propellant therethrough, and to maintain a film of liquid propellant across each pore by surface tension when liquid propellant is not passing therethrough. The films of liquid propellant in the pores of the windows (22) and (24) act as a barrier to the passage of gas therethrough.

5 Claims, 3 Drawing Figures

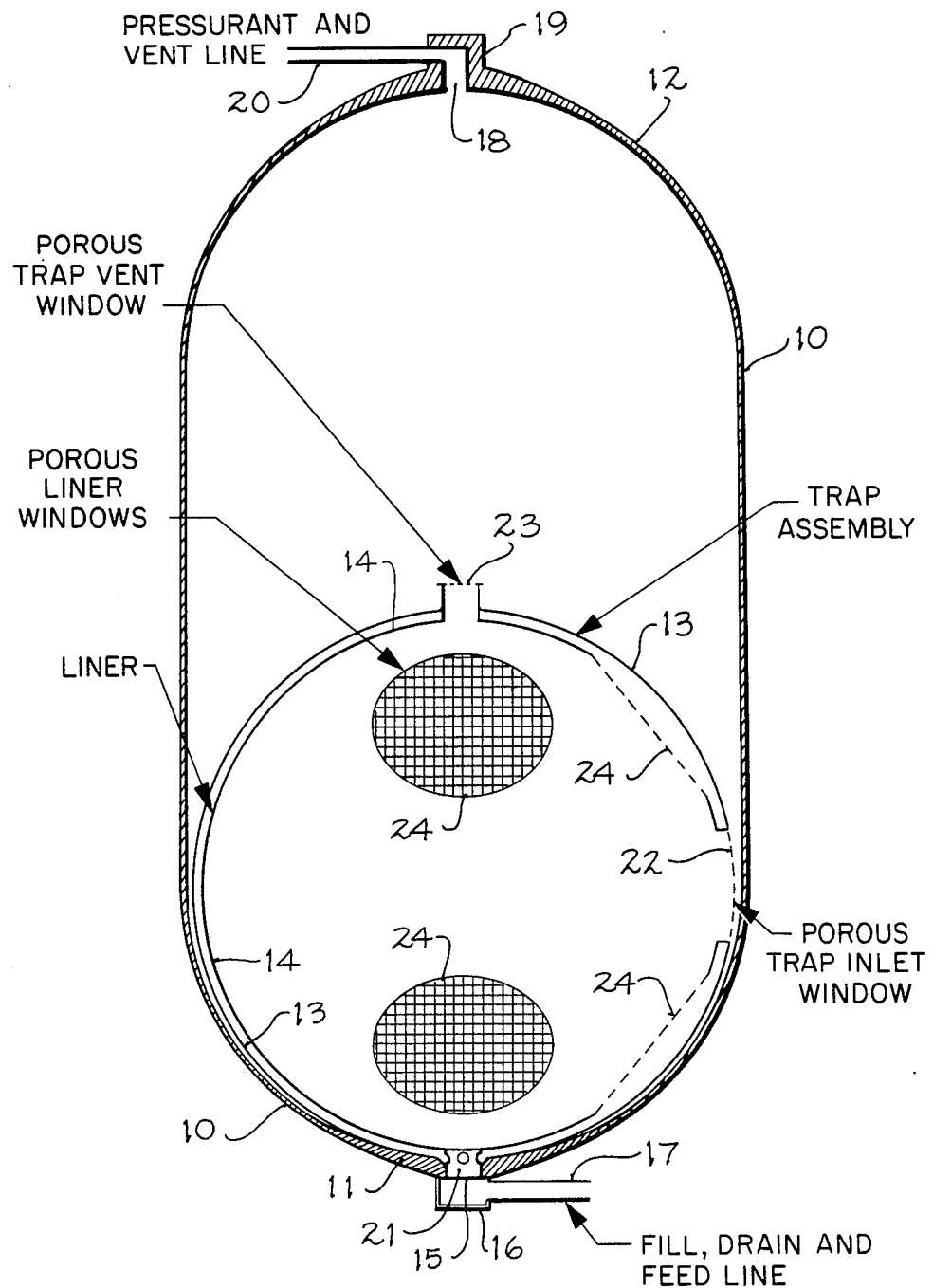
FIG_1

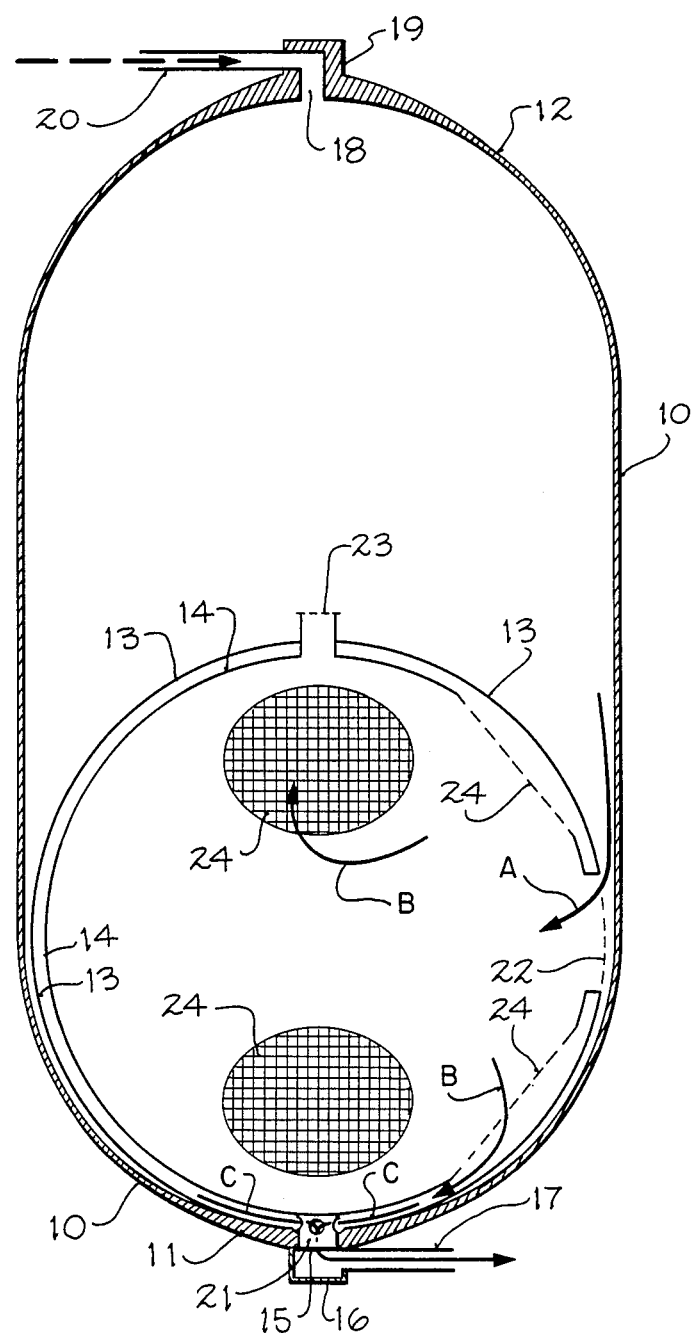
FIG_2

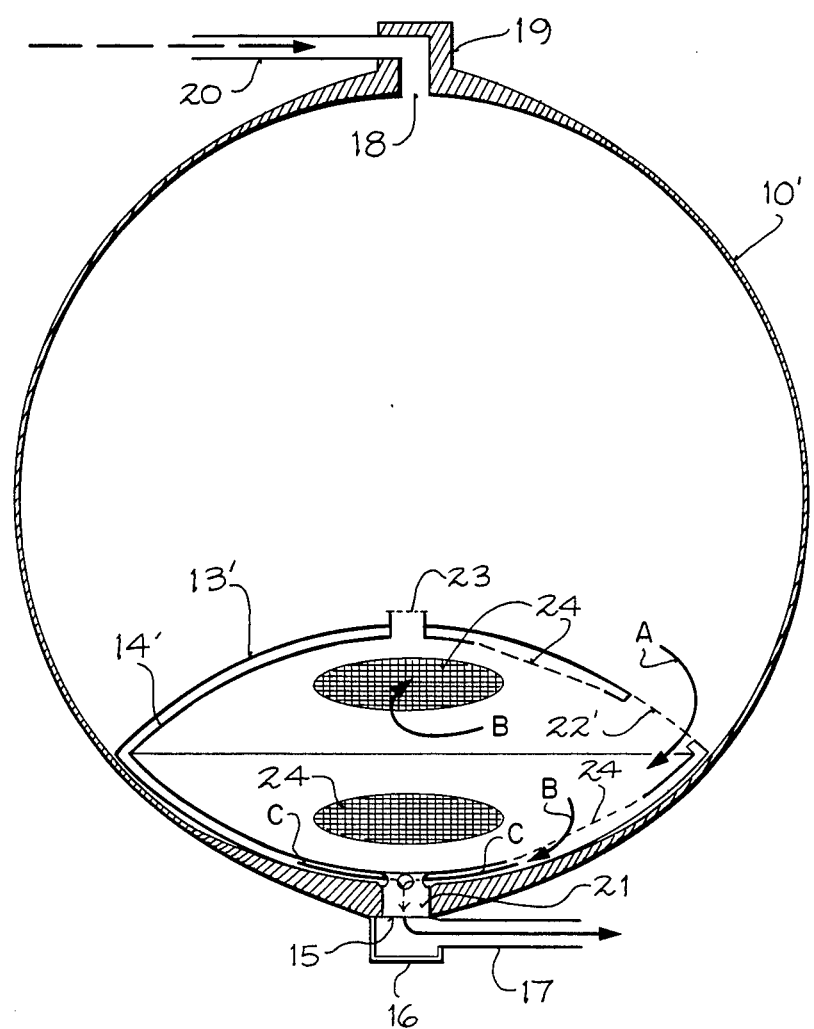
FIG_3 performed. 4,715,399

LIQUID-PROPELLANT MANAGEMENT SYSTEM FOR ROCKETS AND SPACE VEHICLES

TECHNICAL FIELD

This invention relates to liquid-propellant management systems for rockets and space vehicles, and more particularly to a liquid-propellant management system using pressurized gas to control expulsion of liquid propellant from a storage tank to the engine(s) of a rocket or space vehicle.

BACKGROUND ART

Liquid-propellant management systems for use in rocketry and astronautical applications have conventionally comprised deformable or collapsible storage tanks for providing liquid-propellant to the engine(s) of rockets and space vehicles.

As an alternative to the use of deformable or collapsible storage tanks, liquid-propellant management techniques have also been devised in which pressurized gas is used to expel liquid propellant from rigid-walled storage tanks. Until the present invention, however, there has been no effective technique for preventing bubbles of pressurant gas from being expelled with the liquid propellant from a rigid-walled storage tank through a feed line to the engine(s) of a rocket or space vehicle during high accelerations in non-settling directions.

SUMMARY OF THE INVENTION

The present invention provides a technique for controllably expelling liquid propellant by means of pressurized gas from a rigid-walled storage tank comprising no moving parts to the engine(s) of a rocket or space vehicle, whereby substantially gas-free liquid propellant can be delivered to the engine(s) without interruption during prolonged accelerations through rapidly changing velocities and/or rapidly changing directions.

A liquid-propellant management system according to the present invention comprises: (1) a hollow storage tank, (2) a hollow trap positioned inside the storage tank, and (3) a liner positioned inside the trap. The storage tank, which is preferably of generally circularly cylindrical configuration with two hemispherical end portions, has two openings, viz., an opening at one end connectable to a so-called "fill, drain and feed" line, and an opening at the other end connectable to a so-called "pressurant and vent" line.

The trap, which is preferably of spherical configuration, is secured within the end portion of the storage tank adjacent the "fill, drain and feed" line; and an exit port of the trap is aligned with the opening in the tank connectable to the "fill, drain and feed" line. The trap has a porous inlet window for admission of liquid propellant from the interior of the storage tank into the liner inside the trap. Optionally, the trap may also have a porous vent window for exit of gas from the trap into the interior of the tank. The liner, which is contoured generally in conformity with the configuration of the trap, is secured to the trap circumjacent the porous inlet window, the exit port and (if present) the vent window of the trap, and is otherwise spaced apart from the interior surface of the trap. The liner has a plurality of porous windows for outward flow of liquid propellant from the interior of the liner into the volume between the liner and the trap.

The inlet and vent windows of the trap and the windows of the liner all have pores that are dimensioned to permit passage therethrough of liquid propellant in contact with the windows. These porous windows could be made of perforated metal sheets or fine-mesh screens. The size of the pores is such that when liquid propellant is not in contact with the windows (as may occur during certain accelerations with less than a full storage tank), a film of the liquid propellant is maintained across each pore by surface tension after the windows have been wetted by the liquid propellant. The films of liquid propellant in the pores of the trap inlet window act as a barrier to the passage of pressurant gas from the interior of the tank into the interior of the trap liner. Similarly, the films of liquid propellant in the pores of the liner windows prevent pressurant gas from entering into the volume between the liner and the trap.

The trap inlet window is positioned on the side of the trap opposite the "acceleration direction" of the trap, i.e., on the side of the trap in which the liquid propellant usually settles (as determined by the predominant direction in which accelerations of the rocket or space vehicle in which the liquid-propellant management system is installed usually take place). In this way, access is provided for the liquid propellant from the storage tank into the trap during relatively high accelerations.

The vent window is optionally provided on the trap to facilitate escape of pressurant gas from the trap when the tank is being filled with liquid propellant. The vent window also facilitates the escape from the trap of gases generated within the trap during prolonged storage of the liquid propellant.

During unaccelerated flight, or during flight involving changes in speed without significant changes in direction, liquid propellant is provided to the engine(s) via the "fill, drain and feed" line (acting as a feed line) primarily from the interior of the storage tank outside the trap. However, during rapid changes in direction, which would tend to cause the liquid propellant within the storage tank to flow or slosh away from the opening where the tank is connected to the feed line, the trap provides liquid propellant to the feed line. Thus, a liquid-propellant management system according to the present invention enables omnidirectional accelerations to be performed.

DESCRIPTION OF THE DRAWING

FIG. 1 is a cut-away side view, partly in cross section, of a liquid-propellant management system according to the present invention comprising a cylindrical storage tank for liquid propellant.

FIG. 2 is a cut-away side view, partly in cross section, of the liquid-propellant management system of FIG. 1 wherein flow directions for the liquid propellant are indicated.

FIG. 3 is a cut-away side view, partly in cross section, of a liquid-propellant management system according to the present invention comprising a spherical storage tank for the liquid propellant.

BEST MODE OF CARRYING OUT THE INVENTION

A preferred embodiment of the liquid-propellant management system of the present invention is illustrated in FIG. 1 in which a hollow storage tank 10 of generally circularly cylindrical configuration is shown with hemispherical ends 11 and 12. A hollow trap 13 of spherical configuration is positioned inside the tank 10 adjacent the hemispherical end 11, and a trap liner 14 is positioned within the trap 13 adjacent but spaced apart from the interior surface of the trap 13. The tank 11, the trap 13 and the trap liner 14 are fabricated from a substantially non-corrosive metal such as titanium.

The hemispherical end 11 of the tank 10 has an opening 15 through which the interior of the tank 10 communicates by means of a conventional fitting 16 with a so-called "fill, drain and feed" line 17. The other hemispherical end 12 of the tank 10 has an opening 18 through which the interior of the tank 10 communicates by means of a conventional fitting 19 with a so-called "pressurant and vent" line 20.

The trap 13 is secured in a conventional manner to the interior surface of the tank 10 so that an exit port 21 of the trap 13 is aligned with the opening 15 in the hemispherical end 11 of the tank 10. The interior of the trap 13 thus communicates by means of the fitting 16 with the "fill, drain and feed" line 17. The trap 13 has a porous inlet window 22 through which liquid propellant can pass from the interior of the tank 10 into the interior of the trap 13.

The trap 13 may also have a porous vent window 23 through which pressurant gas can pass from the interior of the trap 13 into the surrounding interior of the tank 10. The vent window 23 functions to permit escape of gas from the trap 13 when the tank 10 is being filled with liquid propellant, and also to facilitate escape from the trap 13 of gases generated within the trap 13 during prolonged storage of liquid propellant. In operation, (i.e., during flight of the rocket or space vehicle in which the liquid-propellant management system is installed), the vent window 23 provides a barrier as discussed hereinafter to prevent gas from passing into the trap 13 from the surrounding interior of the tank 10.

In the embodiment shown in FIG. 1, the trap liner 14 is generally spherically contoured in conformity with the configuration of the trap 13. The liner 14 is secured to the trap 13 at three locations, i.e., circumjacent the inlet window 22, the exit port 21 and (if present) the vent window 23, but is otherwise spaced apart from the interior surface of the trap 13 to define a volume between the trap 13 and the liner 14. A plurality of porous windows 24 are located on the surface of the liner 14 to permit passage of liquid propellant from the interior of the trap 13 into the volume between the trap 13 and the liner 14.

In the embodiment shown in FIG. 1, six porous windows 24 are located on the liner 14 at positions designed to provide most efficient access into the liner 14 for liquid propellant from the tank 10. The number of windows 24 and their locations are determined by the particular mission profile of the rocket or space vehicle on which the liquid-propellant management system is installed. Generally, the windows 24 are located opposite the acceleration direction of the trap 13.

Filling of the tank 10 with liquid propellant would normally be accomplished while the tank 10 is stationed on the ground (i.e., in a gravitational environment) in an upright orientation as indicated in FIG. 1. In discussing operation of the liquid-propellant management system of FIG. 1, it is not precisely correct to use the terms "top" and "bottom" when referring to the hemispherical ends 12 and 11, respectively, of the tank 10 because such terms would have no meaning in an extraterrestrial context. However, the terms "top" and "bottom" are useful in designating the particular opposite ends of the tank 10.

When the tank 10 is being filled, the liquid propellant is introduced into the tank 10 via the opening 15 in the hemispherical end 11 at the bottom of the tank 10 by means of the "fill, drain and feed" line 17 functioning as a fill line. The liquid propellant rises in the volume between the trap 13 and the liner 14 until the level of the liquid propellant reaches one of the liner windows 24, whereupon the liquid propellant enters into the trap liner 14. As liquid propellant continues to be introduced into the trap liner 14, the liquid propellant level eventually reaches the trap inlet window 22, whereupon the liquid propellant then flows from the trap 13 into the interior of the tank 10 outside the trap 13. The liquid propellant continues to rise within the tank 10 until the desired "fill" level for the tank 10 is reached, whereupon the fill line 17 is closed.

In operation (i.e., in flight), which may occur in a low-gravity or substantially zero-gravity environment, liquid propellant is expelled from the bottom end 11 of the tank 10 to the engine or engines of the rocket or space vehicle via the "fill, drain and feed" line 17 functioning as a feed line. To expel the liquid propellant from the tank 10 as needed, a pressurized gas such as nitrogen or helium is introduced into the tank 10 via the opening 18 in the top end 12 by means of the "pressurant and vent" line 20 functioning as a pressurant line.

As liquid propellant is consumed by the engine(s), the volume of pressurized gas within the tank 10 must be correspondingly increased. Without the trap 13, the likelihood of bubbles of the pressurant gas being expelled from the tank 10 along with the liquid propellant would increase as the volume of liquid propellant in the tank 10 decreases and the volume of gas increases. Furthermore, without the trap 13, as the volume of liquid propellant in the tank 10 becomes very low, the probability would become smaller that a quantity of liquid propellant would be constantly available at the opening 15 for passage to the feed line 17 regardless of the direction of acceleration experienced by the system.

However, in accordance with the present invention, gas-free liquid propellant is always available for delivery to the engine(s) of the rocket of space vehicle via the feed line 17 regardless of the direction of acceleration, as long as the trap 13 contains liquid propellant. As liquid propellant is consumed by the engine(s), high accelerations of the rocket or space vehicle in various directions can leave the trap inlet window 22 exposed to pressurized gas rather than to liquid propellant. When liquid propellant from the tank 10 cannot enter through the inlet window 22 into the interior of the trap 13 during a particular acceleration, liquid propellant already in the trap 13 is available for delivery to the engine(s) via the feed line 17.

When liquid propellant is delivered to the engine(s) from the trap 13, pressurant gas would tend to enter the trap liner 14 by way of the inlet window 22 and the vent window 23 to replace the liquid propellant expelled from the trap 13, unless a barrier to gas transmission is provided on the inlet window 22 and on the vent window 23. In accordance with the present invention, the inlet window 22 is a perforated sheet or screen structure having a porosity such that a film of liquid propellant remains across each pore thereof due to surface tension whenever a particular acceleration of the system causes liquid propellant in the tank 10 to move or slosh away from the inlet window 22. These films of liquid propellant in the pores of the inlet window 22 act as a barrier to the passage of pressurant gas from the interior of the tank 10 into the interior of the trap 13.

The porous vent window 23 (if present) in the trap 13 likewise is a perforated sheet or screen structure having a porosity that causes a film of liquid propellant to remain across each pore thereof due to surface tension whenever liquid propellant in the tank 10 does not cover the vent window 23. The films of liquid propellant in the pores of the vent window 23 act as a barrier to the entry of pressurant gas into the trap 13.

The porous liner windows 24 are located on the liner 14 so that liquid propellant can always be introduced from the liner 14 into the volume between the trap 13 and the liner 14 through at least one of the windows 24, regardless the particular acceleration experienced by the rocket or spacecraft in which the liquid-propellant management system is installed. Flow directions for liquid propellant from the tank 10 to the feed line 17 during operation of the liquid-propellant management system are indicated by arrows A, B and C in FIG. 2. Liquid propellant passes from the interior of the tank 10, as indicated by arrow A, through the inlet window 22 into the interior of the trap liner 14. From the trap liner 14, the liquid propellant passes, as indicated by arrows B, through the liner windows 24 into the volume between the liner 14 and the trap 13. Thereupon, as indicated by the merging arrows C, the liquid propellant passes from the volume between the liner 14 and the trap 13 through the opening 15 to the feed line 17.

An alternative embodiment of the present invention is illustrated in FIG. 3 in which the tank 10' is of spherical configuration and the trap 13' is of clam-shell configuration. A trap liner 14', which is contoured in conformity with the clam-shell configuration of the trap 13', is positioned inside the trap 13' and is secured thereto circumjacent an inlet window 22', the exit port 21 and (if present) the vent window 23, but is otherwise spaced apart from the interior surface of the trap 13' to define a volume between the trap 13' and the liner 14'. The trap 13' is secured in a conventional manner to the interior surface of the tank 10' so that, just as in the case of the embodiment shown in FIG. 1, the exit port 21 of the trap 13' is aligned with the opening 15 in the tank 10'. As in the case of the embodiment shown in FIG. 1, so also in the case of the embodiment of FIG. 2, the openings 15 and 18 are opposite each other. The porous windows 24 on the surface of the liner 14' permit passage of liquid propellant from the interior of the trap 13' into the volume between the trap 13' and the liner 14'. In this respect, the embodiment shown in FIG. 2 functions in the manner described above for the embodiment of FIG. 1.

This invention has been described above in terms of particular embodiments. However, variations on the embodiments described above would be apparent to practitioners skilled in the art upon perusal of the foregoing description and the accompanying drawing. Therefore, the foregoing description of the invention is to be understood as being only illustrative of the invention, which is defined by the following claims and their equivalents.

We claim:

1. An apparatus for providing substantially gas-free liquid propellant to an engine, said apparatus comprising:
    (a) a hollow storage tank having a first opening and a second opening, said first opening being connectable to a first line through which said liquid propellant can be expelled from said tank to said engine, said second opening being connectable to a second line through which pressurized gas can be introduced into said tank to effect expulsion of said liquid propellant from said tank;
    (b) a hollow trap positioned within said tank, said trap having a porous inlet window for said liquid propellant and an exit port for said liquid propellant, said trap being secured to said tank so that said exit port of said trap communicates with said first opening of said storage tank, said exit port of said trap being connectable to said first line; and
    (c) a liner positioned within said trap, said liner being secured to said trap circumjacent said porous inlet window and circumjacent said exit port of said trap, said liner being spaced apart from said trap elsewhere within said trap to define a volume between said liner and said trap, said liner having a plurality of porous windows;
said porous inlet window of said trap and said porous windows of said liner having pores dimensioned to permit passage therethrough of said liquid propellant, said pores maintaining a barrier of said liquid propellant on said windows by surface tension when liquid propellant is not passing therethrough, said barrier precluding passage of said gas therethrough.

2. The apparatus of claim 1 wherein said storage tank is of generally circularly cylindrical configuration with two generally hemispherically configured end portions, and wherein said trap is of generally spherical configuration, said trap being dimensioned to be secured to said tank adjacent one of said hemispherically configured end portions.

3. The apparatus of claim 1 wherein said storage tank is of generally spherical configuration, and wherein said trap is of generally clam-shell configuration, said trap being dimensioned to be secured to said tank so that an exterior surface portion of said trap is positioned adjacent an interior surface portion of said tank.

4. The apparatus of claim 1 wherein said trap also has a porous vent window for exit of gas from said trap when said tank is being filled with said liquid propellant, said vent window having pores dimensioned to maintain a barrier of said liquid propellant on said vent window by surface tension when said engine is in operation.

5. The apparatus of claim 1 wherein said liner and said trap are generally similar in configuration, said liner being smaller than said trap.

* * * * *